US011820258B2

(12) United States Patent
Bahr et al.

(10) Patent No.: US 11,820,258 B2
(45) Date of Patent: Nov. 21, 2023

(54) FLEXIBLE STRUCTURAL COMPONENT AND USE

(71) Applicant: Adient Engineering and IP GmbH, Burscheid (DE)

(72) Inventors: Daniel Bahr, Kürten (DE); Thomas Frotz, Wermelskirchen (DE); Rudolf Wilhelm Hemmelrath, Leverkusen (DE)

(73) Assignee: Adient US LLC, Plymouth, MI (US)

( * ) Notice: Subject to any disclaimer, the term of this patent is extended or adjusted under 35 U.S.C. 154(b) by 60 days.

(21) Appl. No.: 17/598,932

(22) PCT Filed: Apr. 1, 2020

(86) PCT No.: PCT/EP2020/059292
§ 371 (c)(1),
(2) Date: Sep. 28, 2021

(87) PCT Pub. No.: WO2020/201374
PCT Pub. Date: Oct. 8, 2020

(65) Prior Publication Data
US 2022/0212573 A1  Jul. 7, 2022

(30) Foreign Application Priority Data
Apr. 1, 2019  (DE) .................... 10 2019 204 614.2

(51) Int. Cl.
*A47C 3/021*  (2006.01)
*B60N 2/68*  (2006.01)
(Continued)

(52) U.S. Cl.
CPC ............... *B60N 2/22* (2013.01); *A47C 3/021* (2013.01); *B60N 2/686* (2013.01); *B60N 3/001* (2013.01)

(58) Field of Classification Search
CPC ............................... A47C 3/021; B60N 2/686
See application file for complete search history.

(56) References Cited

U.S. PATENT DOCUMENTS 3,565,482 A * 2/1971 Blodee .................. A47C 7/14
297/284.3
3,877,750 A * 4/1975 Scholpp ................ A47C 1/143
297/284.3
(Continued)

FOREIGN PATENT DOCUMENTS

CN       101868168 A    10/2010
DE    102016123510 A1     6/2017

OTHER PUBLICATIONS

European Patent Office, International Search Report and Written Opinion in Application No. PCT/EP2020/059292, dated Jul. 20, 2020, 10 pages, Rijswijk, Netherlands.

*Primary Examiner* — Timothy J Brindley
(74) *Attorney, Agent, or Firm* — Marshall & Melhorn, LLC

(57) ABSTRACT

A structural component may have a flexible structure with at least one adjusting mechanism, which may be formed at least from a plurality of folded elements or lever elements and spacing elements that are coupled to one another in such a way that their upper surfaces are connected to one another by an upper flat element and their lower surfaces are connected to one another by a lower flat element. The upper flat element and the lower flat element may be configured to be moved in a defined manner in the event of a tilting movement of the flexible structure.

16 Claims, 11 Drawing Sheets

(51) Int. Cl.
  *B60N 2/22* (2006.01)
  *B60N 3/00* (2006.01)

(56) References Cited

U.S. PATENT DOCUMENTS

| | | | | |
|---|---|---|---|---|
| 4,157,203 | A * | 6/1979 | Ambasz | A47C 7/448 |
| | | | | 297/285 |
| 4,585,272 | A * | 4/1986 | Ballarini | A47C 3/12 |
| | | | | 297/285 |
| 5,320,410 | A * | 6/1994 | Faiks | A47C 7/405 |
| | | | | 297/285 |
| 6,471,293 | B2 * | 10/2002 | Ware | A47C 7/445 |
| | | | | 297/285 |
| 6,739,663 | B2 * | 5/2004 | Gevaert | A47C 7/445 |
| | | | | 297/297 |
| 6,877,816 | B1 * | 4/2005 | Farmont | A47C 31/126 |
| | | | | 297/380 |
| 7,320,503 | B2 * | 1/2008 | Eysing | B60N 2/914 |
| | | | | 297/285 |
| 7,648,201 | B2 * | 1/2010 | Eysing | A47C 7/46 |
| | | | | 297/284.3 |
| 7,926,879 | B2 * | 4/2011 | Schmitz | A47C 1/03255 |
| | | | | 297/340 |
| 8,414,073 | B2 * | 4/2013 | Schmitz | A47C 1/03288 |
| | | | | 297/321 |
| 9,084,476 | B2 | 7/2015 | Mojtabavi et al. | |
| 9,176,535 | B2 | 11/2015 | Bohn et al. | |
| 10,299,602 | B2 * | 5/2019 | Wu | A47C 3/20 |
| 10,793,029 | B2 * | 10/2020 | Jung | B60N 2/68 |
| 2018/0298660 | A1 | 10/2018 | Arendts | |

\* cited by examiner

FLEXIBLE STRUCTURAL COMPONENT AND USE

FIELD

The invention relates to a flexible structural component. Furthermore, the invention relates to the use of such a flexible structural component and to a seat component, and to a seat.

Flexible structural components are well known and can be used for example for a seat, in particular a vehicle seat.

BACKGROUND

Such structural components usually exhibit a fiber-reinforced thermoplastic with integrated fiber reinforcements. In order to put the seat into different positions, such as a sitting comfort position, a bed position or a folded position, the seat is formed in a multipart manner, for example from a backrest, a seating part and a foot part, which are connected together in a rotatable manner by rotary or latching fittings.

SUMMARY

An object of the invention is to specify a flexible structural component which is adjustable easily into one of a plurality of positions. A further object of the invention is to specify a use and an improved seat component, in which different positions and supporting variants are easily settable, and a seat having such an improved seat component.

As regards the structural component, the object is achieved by the features of the claims. As regards the use, the object is achieved by the features of the claims. As regards the seat component, the object is achieved by the features of the claims. As regards the seat, the object is achieved by the features of the claims.

Developments of the invention are the subject matter of the dependent claims.

The object is achieved according to the invention by a flexible structural component, in particular a kinetic structural component, which comprises at least one, in particular integrated, adjusting mechanism which is formed at least from a plurality of folding elements or flexible lever elements and spacer elements which are coupled together such that their upper surfaces are connected together by an upper surface element and their lower surfaces are connected together by a lower surface element, wherein the upper surface element and the lower surface element move in a defined manner in the event of a folding or bending movement of the structural component, in particular move toward or with respect to one another.

The advantages that are achieved by the invention, in particular a combination of folding/lever elements with spacer elements as adjusting mechanism, are in particular that a structural component configured for example as a relatively thick composite panel can be bent without its surfaces (upper side and lower side) stretching or expanding. In the following text, the embodiments of the adjusting mechanism are described using the example of the folding elements.

The invention makes use of the known active principles of folding elements or of levers as adjusting elements and allows the one and/or the other mechanism to take effect optimally for the respectively present function during use, wherein as a result of clever design and construction, various individual parts can be used simultaneously or alternately in both mechanisms.

In one possible embodiment, the integrated adjusting mechanism is formed as a folded construction made up of a plurality of folding elements or lever elements in combination with a plurality of spacer elements that are coupled together in terms of movement.

In one development, the at least one folding element is configured as an extensive or strip-like folding element with at least a 1-fold mechanism or a multi-fold mechanism. Preferably, the folding element is configured as a 2- or 3-fold mechanism with corresponding two or three folded edges, respectively. The lever elements can be configured as a 1-joint or multi-joint mechanism. In this case, the joints are configured in particular as film or hinge joints.

The folding element or the lever element is arranged between two spacer elements or against one spacer element. For example, opposite ends of the folding element or lever element are fastened respectively to adjacent or adjoining spacer elements. In this case, the folding element or lever element can be fastened directly or indirectly to the spacer element.

In one possible embodiment, the folding elements or lever elements are connected to the spacer elements in different orientations. As a result, the upper surface element and the lower surface element can easily be kept in a vertical orientation (in particular Z-direction) with respect to one another.

In a further embodiment, a plurality of folding elements or a plurality of lever elements, which are arranged in an offset manner with respect to one another, are arranged between two spacer elements. For example, the folding or lever elements can be arranged in a manner offset through 90° with respect to one another. In particular, at least two folding elements or lever elements are arranged in such an offset (or rotated) manner with respect to one another that their folded edges or joint axes are perpendicular to one another. Thus, it is possible for example for two outer folding elements to have horizontally extending folded edges and a middle folding element arranged between these two outer folding elements to have a vertically extending folded edge. As a result, the surface elements can be kept in a defined manner with respect to one another.

The upper and lower surface elements are configured for example in a sheet-like manner and manufactured for example from a thin, flexible material, in particular from plastic, for example polypropylene, or from metal, for example spring steel, or some other suitable material. In particular, the upper and lower surface elements are configured in a flexible manner. In this case, the upper and lower surface elements can have such a thickness or material thickness and/or material characteristics/properties that they are flexible enough to be able to be inclined, folded or bent permanently in a defined radius through at least 90 degrees.

The kinetic offset is in this case formed for example from the flexible upper and lower surface elements and the spacer elements located in between. The height of the spacer elements determines the actual size of the offset.

In a further embodiment, in each case half the number of spacer elements are alternately connected to the upper and lower surface element, respectively. In this case, the spacer elements are coupled together in terms of movement by the folding elements such that the mutual spacing of the spacer elements changes in the event of a folding or bending movement of the flexible structure.

In this case, the spacer elements of the respective surface element can be connected together by the flexible lever elements, in particular in each case three flexible lever elements, or three folding elements. The lever elements or folding elements can be connected to the spacer elements in different orientations. As a result, the upper and lower surface elements can be kept in a vertical and thus in the Z direction with respect to one another. If the structural component and thus the offset is inclined or bent, the upper surface element and the lower surface element move with respect to one another in relation to their total material thickness. In the process, the spacing of the spacer elements changes. The spacer elements move apart from one another or toward one another. The flexible lever elements or folding elements are folded together or apart. A structural component configured in this way allows a relatively thick component of the composite panel type, which can be bent without one of the outer surfaces having to be stretched or compressed.

In this case, the movement of the spacer elements and thus bending of the structural component can take place in a controlled manner. For control, a motor-transmission unit in combination with a flexible shaft, in particular a trapezoidal shaft, which controls the spacer elements in a non-positive manner with respect to one another, can be provided. The kinetic structural component can be deformed, in particular bent, at a particular angle or in an S shape in a non-positive manner, and be kept stably in the position adopted in each case.

Such a structural component with optional control of the movement can be used in different shapes and sizes, for example for a movable door or for adjustable partition walls or for seat supports of a vehicle or aircraft seat, and for side flanks or lumbar supports, or for a bendable display unit or a wall display screen or spring suspension mat or an adjustable table or an adjustable armrest.

In one possible embodiment, the kinetic structural component is produced from plastic, in particular by injection molding, stamping or by a 3D printing process. As a result, folded edges or joints having very thin webs can be produced. The configuration of the flexible structure with serial fold or joint kinematics made of plastic allows flexural fatigue strength and high tensile/compressive strength.

In particular, the flexible structure and/or subregions thereof can be produced in the form of a flexible 3D plastics structure by an injection-molding process or a 3D printing process. It is also possible to produce the entire kinetic structural component with the outer surface elements and the flexible structure provided between these outer surface elements by an injection-molding process or a 3D printing process.

The surface elements of the structural component are configured in particular in the form of shells or cushions, for example in the form of sheets. The outer surface elements can have a planar shape. Alternatively, they can be ergonomically shaped and configured in an extensive manner.

The advantages achieved by the invention are in particular that the flexible structure and thus the structural component are stable, in particular torsion-resistant, during bending. Furthermore, the folding or lever elements are folded open or together synchronously via the entire extension of the structural component and/or of subregions, thereby allowing variable, surface-related different support of the user of the seat. In this case, the expansion or compressing movement of the folding or lever mechanism of the flexible structure and/or such configured subregions is controllable and scalable.

The flexible 3D configuration of the flexible structure or subregions thereof allows complex structures, which can be deformed, in particular bent or moved easily in a controlled and driven manner, for example expanded to form a curve or an arc.

Furthermore, the flexible structure, on account of the different flexible configuration and shape, makes it possible for regions of the flexible structure to expand in different directions, for example to be folded open, or compressed, for example folded together.

In the case of a structural component that forms a seat with a footrest, seating part and backrest, the footrest, the seating part and the backrest or subregions thereof, such as side flank regions, lumbar region, can be varied in terms of shape and/or dimensions at various points with the movement of the flexible structure. Optionally, a separate drive can be provided in order to appropriately control the expansion or compression of the flexible structure.

As regards the seat component, in particular a backrest or a seating part, the object is achieved according to the invention in that the seat component comprises at least one support structure, padding and/or a cover and a structural component as described above in all its various embodiments. In this case, at least one substructure of the structural component or the entire structural component is coupled in terms of movement to the padding and/or the cover.

In one possible embodiment, the respective spacer element can be coupled in terms of movement to the padding and/or the cover. In this case, the structural component can be arranged between the supporting structure and the padding and/or the cover and form at least a subregion of the seat component or the entire seat component.

As regards a seat, the object is achieved according to the invention in that the seat comprises at least two seat components that are movable relative to one another, of which at least one of the seat components has the structural component described above in various embodiments. In the event of a folding or bending movement of one of the seat components itself or a movement of at least one seat component relative to the other seat component, the flexible structure of the structural component is set up such that it also carries out the movement, wherein the upper and the lower surface element each move away from one another.

If the structural component is used for a seat, in particular a vehicle or aircraft seat, wherein subregions of the seat or of one of the seat components, such as a lumbar support, side flanks, is formed from the in particular monolithic flexible structure, it is possible, during the adjustment of the seat for example from a sitting into a lying position, for the expansion or compression of the in particular monolithic flexible structure in the subregion of the seat to allow corresponding support and thus adaptation to different requirements. Thus, it is possible for the structural component, in particular its substructure or subregion, to be actuated and moved for example in such a way that the seat has, in a seating or comfort position, more lateral support than in a lying or bed position. Alternatively, the flexible structure can form the entire surface of the seat. The folding or lever elements can be arranged beneath padding, in particular foam padding, and accordingly move beneath the foam padding in the event of expansion, in particular folding open, in the direction of the foam padding, and open up in particular to form a curve or arc and/or in a linear manner, in particular vertically, and press against the foam padding, so as to allow corresponding support. Alternatively, the series of expansion or lever elements can be integrated into the foam padding, in particular be arranged directly therein, and move in the event of expansion, in particular folding open, in the direction of a surface of the foam padding, and open up in particular to form a curve or an arc and/or in a linear manner, in particular vertically.

DESCRIPTION OF THE FIGURES

Exemplary embodiments of the invention are explained in more detail with reference to drawings, in which.

Mutually corresponding parts are provided with the same reference signs throughout the figures.

DETAILED DESCRIPTION

Figure 1:
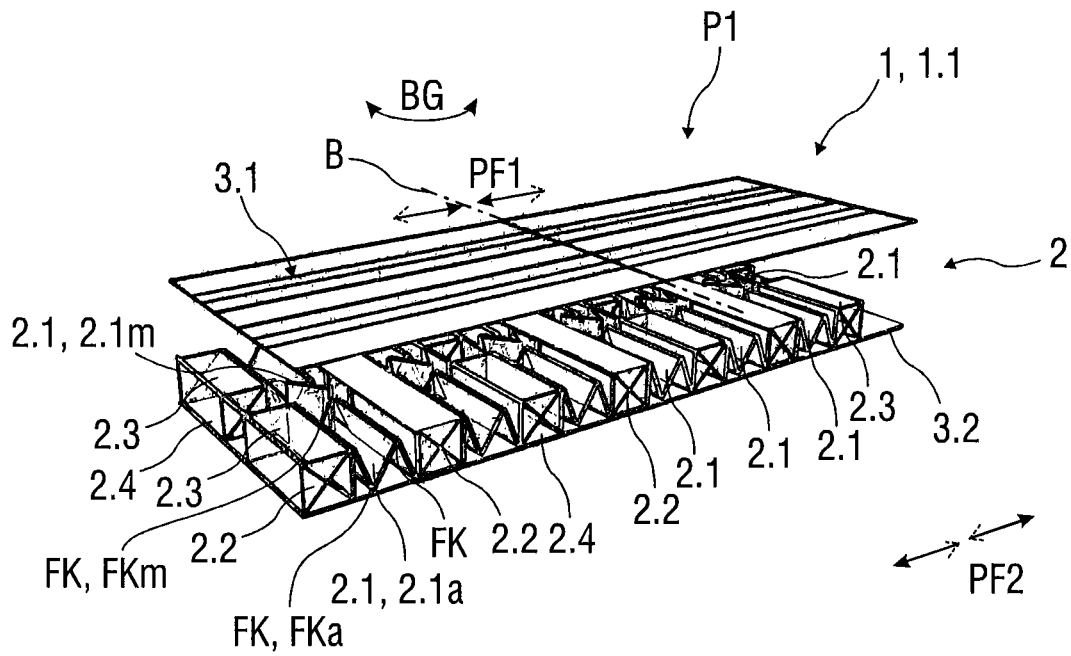
FIG. 1 schematically shows an exploded illustration of a flexible structural component, FIG. 2 schematically shows a perspective illustration of a flexible structural component, FIG. 3 schematically shows a different illustration of the flexible structural component, FIG. 4 schematically shows a different illustration of the flexible structural component, FIG. 5A schematically shows a further embodiment of a flexible structural component, FIG. 5B schematically shows a further embodiment of a flexible structural component, FIG. 6A schematically shows an embodiment of a flexible structural component forming a seat component, FIG. 6B schematically shows an embodiment of a flexible structural component forming a seat component, FIG. 6C schematically shows an embodiment of a flexible structural component forming a seat component, FIG. 7A schematically shows an embodiment of a flexible structural component forming a lamp, FIG. 7B schematically shows an embodiment of a flexible structural component forming a lamp, FIG. 8A schematically shows an embodiment of a flexible structural component forming a lamp, FIG. 8B schematically shows an embodiment of a flexible structural component forming a lamp, FIG. 8C schematically shows an embodiment of a flexible structural component forming a lamp, FIG. 9 schematically shows an embodiment of a drive unit of an adjustable flexible structural component, FIG. 10 schematically shows a flexible structural component in a set bent position, FIG. 11 schematically shows an embodiment of a flexible structural component forming a seat component, FIG. 12 schematically shows an embodiment of a flexible structural component forming a seat component, FIG. 13 schematically shows an embodiment of a flexible structural component forming a display unit, FIG. 14 schematically shows an embodiment of a flexible structural component forming a display unit, FIG. 15 schematically shows an embodiment of a flexible structural component forming a seat component, and FIG. 16 schematically shows an embodiment of a flexible structural component forming an adjustable table.
Figure 2:
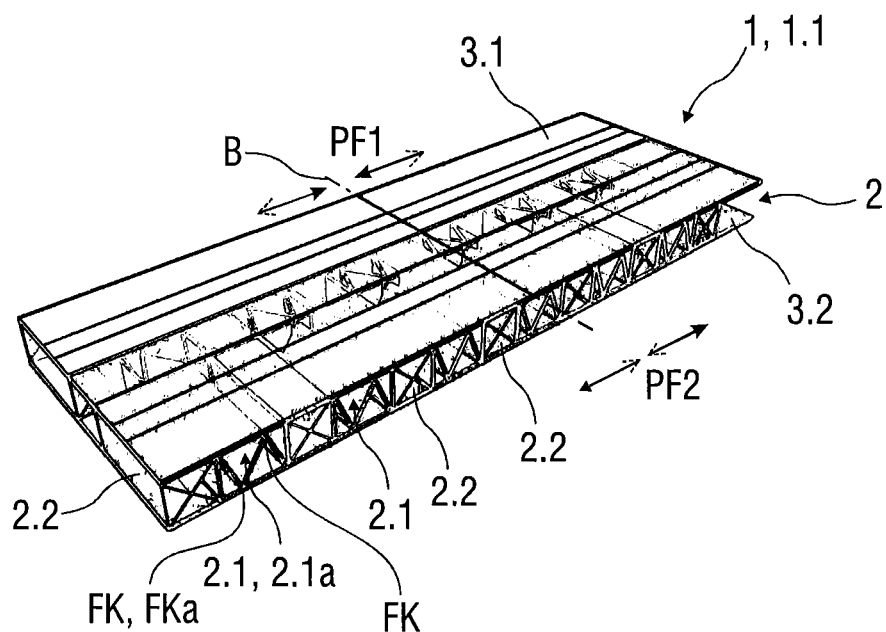

FIG. 1 schematically shows an exploded illustration of a structural component 1 in a flat position or bed position P1. FIG. 2 shows a perspective illustration of the structural component 1.

The structural component 1 is configured as a kinetic structural component. The structural component 1 comprises an adjusting mechanism 2 which is formed at least from a plurality of lever elements or folding elements 2.1 and spacer elements 2.2 which are coupled together in terms of movement such that their upper surfaces 2.3 are connected together by an upper surface element 3.1 and their lower surfaces 2.4 are connected together by a lower surface element 3.2, wherein the upper surface element 3.1 and the lower surface element 3.2 move in a defined manner in the event of a bending movement of the structural component 1. Thus, for example subregions 3.1 of the upper surface element 3.1 move, in the event of a bending or inclination movement BG about a bending axis B, in a defined manner toward one another as per arrows PF1 and subregions of the lower surface element 3.2 move with respect to one another as per arrows PF2.

The upper and lower surface elements 3.1, 3.2 are configured for example in a sheet-like manner. In particular, the upper and lower surface elements 3.1, 3.2 are configured in a flexible manner. In particular, the upper surface element 3.1 and the lower surface element 3.2 are each formed from such a flexible material and/or with such a material thickness that they are each able to be bent or inclined in a defined radius through at least 90 degrees. For example, the upper surface element 3.1 and the lower surface element 3.2 are each manufactured from a thin, flexible material, in particular from plastic, for example polypropylene, or from metal, for example spring steel, or some other suitable material.

The structural component 1 comprises a flexible structure 1.1 with the at least one integrated adjusting mechanism 2. The adjusting mechanism 2 is configured in particular as a folding mechanism or lever joint mechanism. The adjusting mechanism 2 can in this case use folding or lever elements 2.1 as adjusting elements.

The integrated adjusting mechanism 2 is formed as a folded construction made up of a plurality of folding elements or lever elements 2.1 and a plurality of spacer elements 2.2 which are coupled together in terms of movement.

In the following text, the invention is described in more detail on the basis of folding elements 2.1:

In this case, the folding elements 2.1 are each configured as an extensive or strip-like folding element 2.1 with at least a 1-fold mechanism or a multi-fold mechanism.

At least one or more folding elements 2.1 is/are arranged between two spacer elements 2.2. In this case, a plurality of folding elements 2.1 can be arranged in an offset manner with respect to one another between two spacer elements 2.2. For example, at least two folding elements 2.1 are arranged in an offset manner with respect to one another such that their folded edges FK are perpendicular to one another.

FIG. 1 shows for example elongate hollow or profile elements as spacer elements 2.2. Between two such elongate spacer elements 2.2, in each case three folding elements 2.1 are arranged alongside one another along the extent of the spacer elements 2.2. In this case, two outer folding elements 2.1a are configured as a 2-fold mechanism with a horizontal folded edge FKa, which extends parallel to the extent of the spacer elements 2.2. A further, middle folding element 2.1m is arranged between the two outer folding elements 2.1a and configured as a 2-fold mechanism with a vertical folded edge FKm, which extends perpendicular to the horizontal folded edge FKa.

The folding elements 2.1 can be connected directly or indirectly to the spacer elements 2.2. Furthermore, the folding elements 2.1 can be connected to the spacer elements 2.2 in different orientations.

In particular, the spacer elements 2.2 are coupled together in terms of movement by the folding elements 2.1, wherein the mutual spacing of the spacer elements 2.2 changes during an inclination movement BG, in particular a folding or bending movement, of the flexible structure 1.1.

Figure 3:
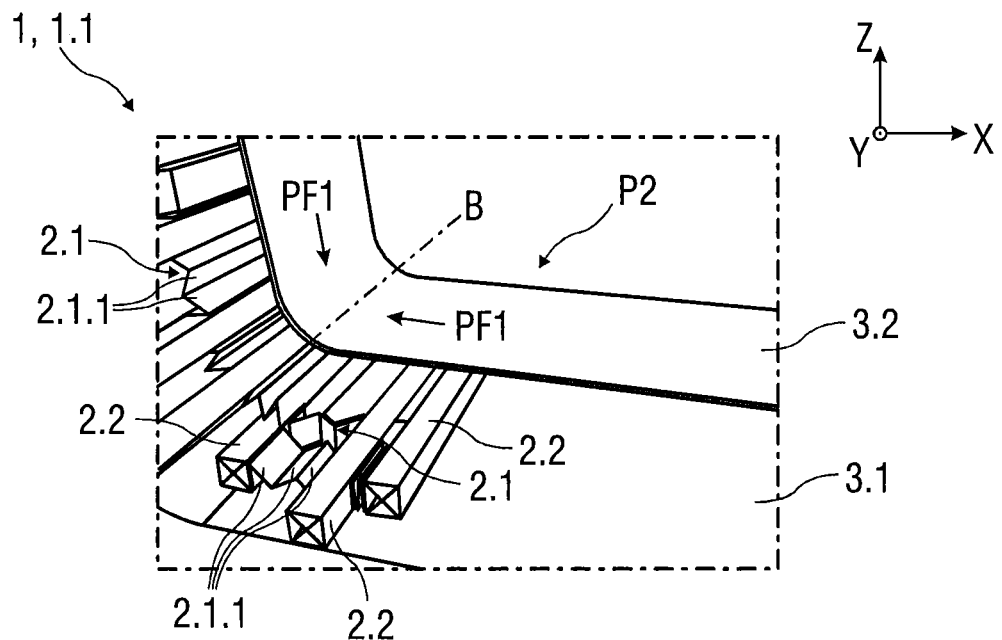
Figure 4:
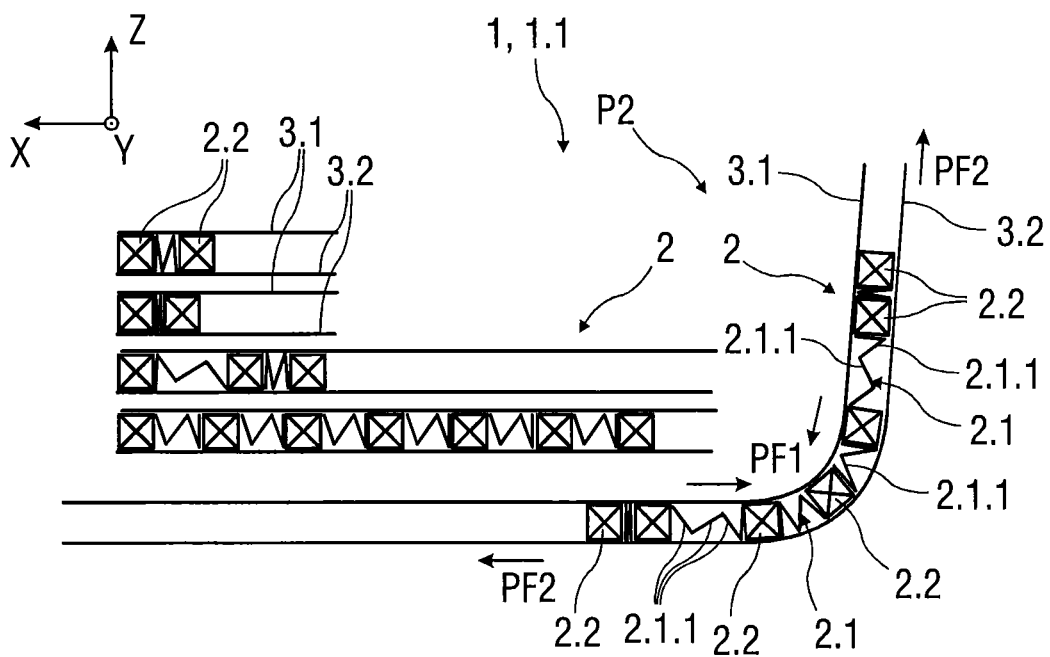

FIGS. 3 and 4 schematically show the structural component 1 in different illustrations and in a bend position P2. In this case, the upper and lower surface elements 3.1, 3.2 can have such a thickness or material thickness and/or material characteristics/properties that they are flexible enough to be able to be inclined or bent permanently in a defined radius through at least 90 degrees.

The kinetic offset and thus the kinetic structural component 1 is in this case formed for example from the flexible upper and lower surface elements 3.1 and 3.2 and the spacer elements 2.2 located in between. The height of the spacer elements 2.2 determines the actual size of the offset and thus of the structural component 1.

In a further embodiment, as shown in FIG. 4, in each case half the number of spacer elements 2.2 are alternately connected to the upper surface element 3.1 and the lower surface element 3.2, respectively, or vice versa.

In this case, the spacer elements 2.2 of the respectively associated surface element 3.1 or 3.2, to which the spacer elements 2.2 are connected, can be connected together by flexible folding or lever elements 2.1.1, in particular in each case three flexible folding or lever elements 2.1.1.

The folding or lever elements 2.1 can be connected to the spacer elements 2.2 in different orientations. As a result, the upper surface element 3.1 and the lower surface element 3.2 can be kept together in a vertical and thus Z direction. If the structural component 1 and thus the offset is inclined or bent, the upper surface element 3.1 and the lower surface element 3.2 move with respect to one another in relation to their total material thickness. In the process, the spacing of the spacer elements 2.2 changes. The spacer elements 2.2 either move away from one another or toward one another. The flexible folding or lever elements 2.1.1 are accordingly folded together or apart. A structural component 1 configured in such a way allows a relatively thick component of the composite panel type, which can be bent without one of the outer surfaces having to be stretched or compressed.

Figure 5A:
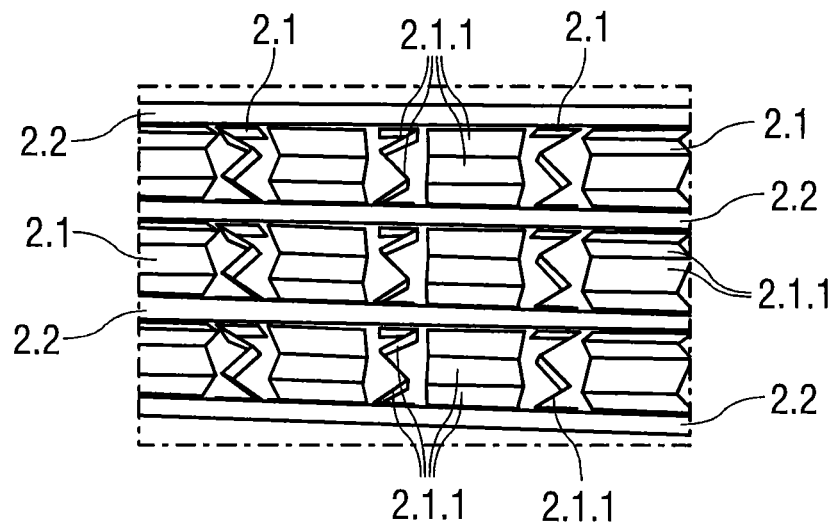
Figure 5B:
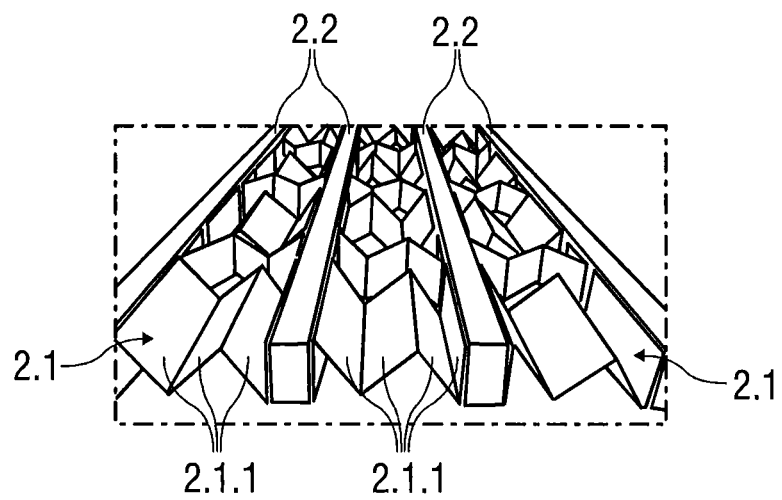

FIGS. 5A and 5B schematically show the flexible structural component 1 with elongate spacer elements 2.2, wherein in each case two spacer elements 2.2 are spaced apart from one another along the entire length in a movable manner by a plurality of folding or lever elements 2.1. In this case, each folding or lever element 2.1 is configured as a flexible folding or lever element 2.1.1. For example, the flexible folding or lever element 2.1.1 is formed as a folded or concertina-like element with three levers. Furthermore, the flexible folding or lever elements 2.1.1 are each alternately oriented differently between two spacer elements 2.2, in particular turned through 90° with respect to one another. As a result, the upper surface element 3.1 and the lower surface element 3.2 can be kept in the Z direction with respect to one another.

Figure 6A:
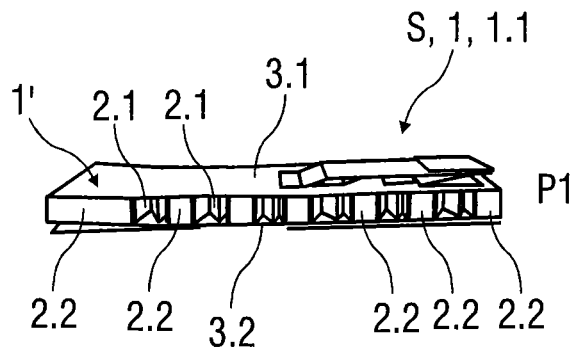
Figure 6B:
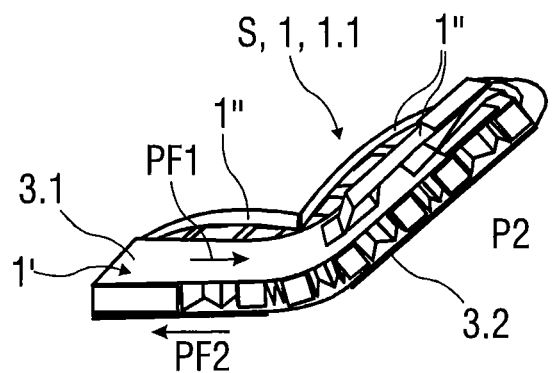
Figure 6C:
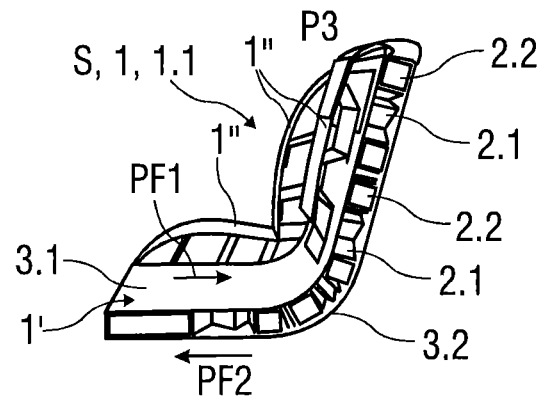
Figure 7A:
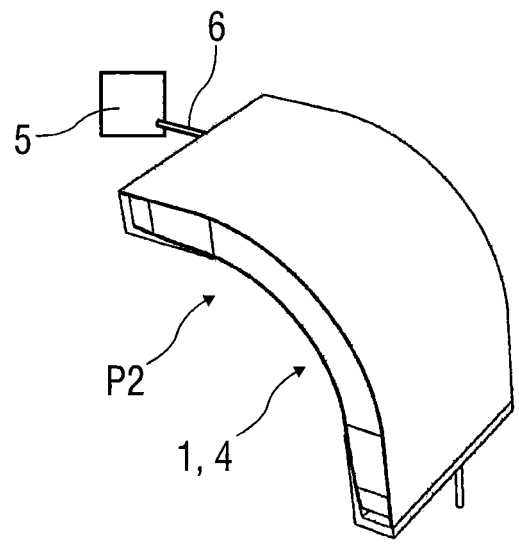
Figure 7B:
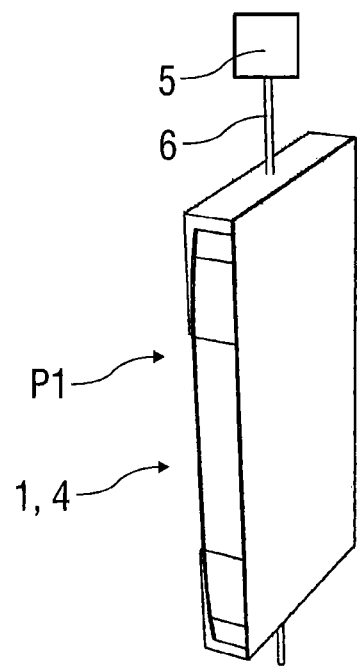
Figure 8A:
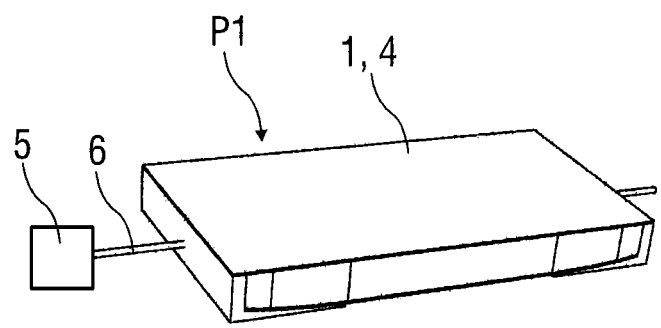
Figure 8B:
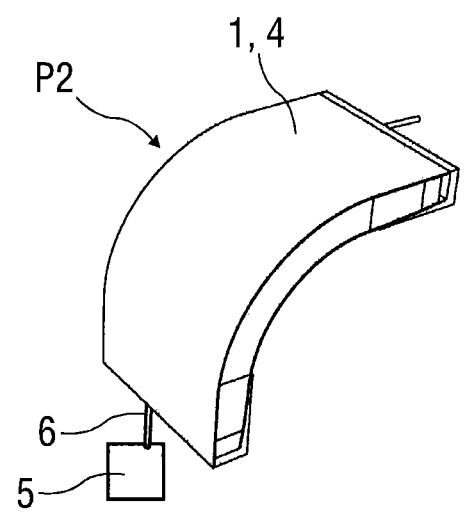
Figure 8C:
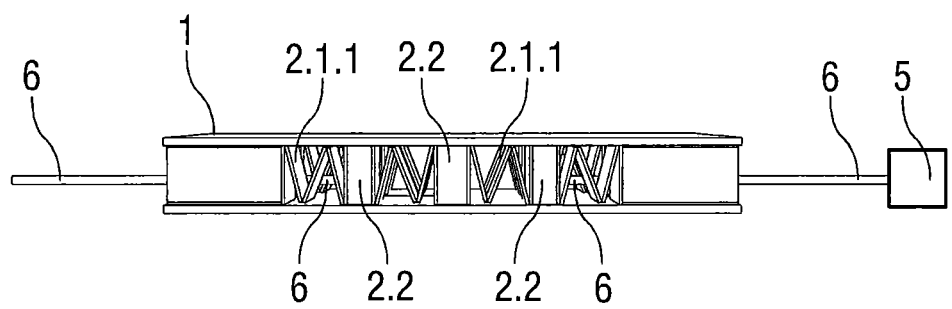

FIGS. 6A to 6C schematically show an application of the above-described structural component 1 for a seat component of a seat S in various positions P1 to P3, wherein P1 represents a bed position, P2 an inclined position and P3 a sitting position.

The seat S comprises the structural component 1, which forms, as a monolithic, variably settable structural component 1', the seating part and the backrest of the seat S. In addition, further structural components 1" can be arranged on the monolithic structural component 1' or be formed as a single monolithic component therewith. The further structural component or these further structural components 1" form one or more variably settable supporting regions, in particular a variably settable back support and/or lateral support. In this case, a plurality of supporting regions can be adjusted synchronously, in particular be synchronously expanded or compressed, when the monolithic structural component 1' is inclined. Alternatively or in addition, individual supporting regions can be adjusted, in particular expanded or compressed, separately.

The structural component 1 can in this case be part of the padding or form the padding of the seat S. The structural component 1 is arranged on a support structure that is not illustrated in more detail. In this case, the structural component 1 is coupled to the padding and/or the cover in terms of movement.

In the event of an inclination movement BG of the backrest relative to the seating part, as shown in FIGS. 6B and 6C, the flexible structure 1.1 of the structural component 1 is set up such that it also carries out the movement, wherein the upper surface element 3.1 and the lower surface element 3.2 move in a defined manner. In particular, they move away from one another as per arrows PF1 and PF2. As a result, compression or stretching of the surface elements 3.1 and 3.2 is avoided and a crease-free surface allowed.

FIGS. 7A to 8C schematically show an application of the above-described flexible structural component 1 for a lamp 4 in various set positions P1 to P2, wherein P1 represents a vertical position and P2 a position inclined through 90°.

In this case, the movement of the spacer elements 2.2 and thus bending of the structural component 1 can take place in a controlled manner. For control, a motor-transmission unit 5 in combination with a flexible shaft 6, in particular a trapezoidal shaft, can be provided. The motor-transmission unit 5 is coupled to the spacer elements 2.2 in terms of movement by the shaft 6 and drives them toward one another in a non-positive manner such that the kinetic structural component 1 can be deformed, in particular bent, in a non-positive manner at a particular angle or in a curved or arc shape, in particular an S shape, and can be kept stably in the respectively adopted bent position P2.

Figure 9:
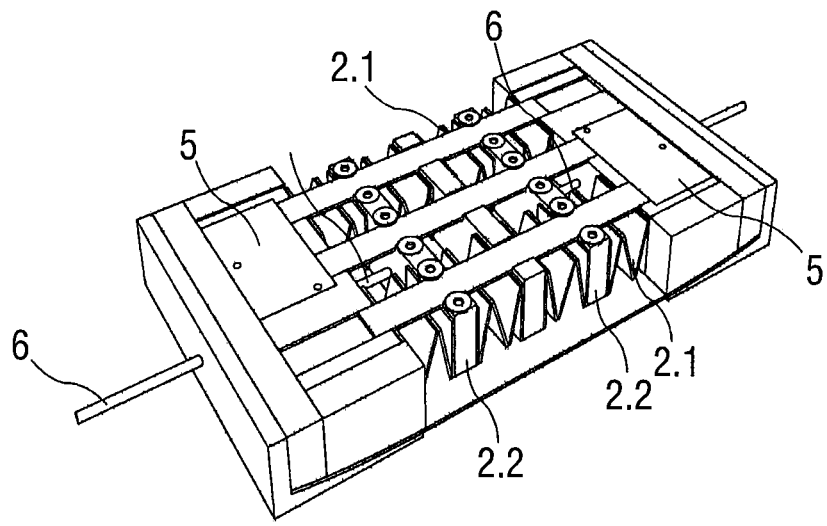

FIG. 9 shows a further embodiment of a flexible structural component 1 having two motor-transmission units 5, which are each arranged at a longitudinal end of the structural component 1. From each motor-transmission unit 5 there extends a shaft 6, which is coupled in terms of movement in each case to a number of closest spacer elements 2.2.

Figure 10:
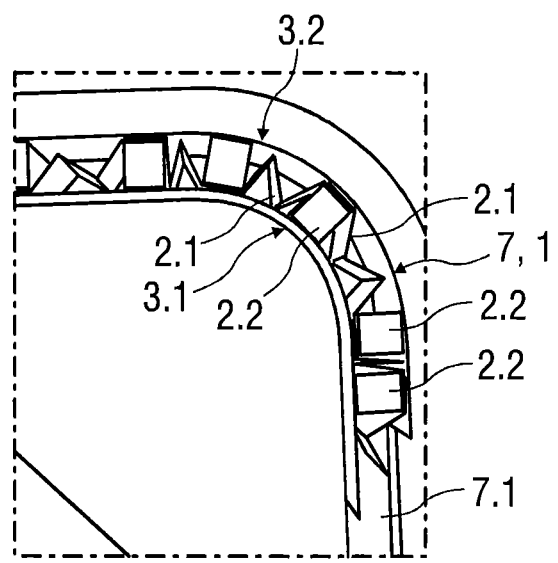

Such a structural component 1 with optional control of the movement can be used in different shapes and sizes, for example for a movable door or for adjustable partition walls 7, as shown in FIG. 10. In the case of a movable door or movable partition walls 7, the control can take place in a guide rail 7.1 or sliding rail, with the result that a closed surface and a stable structure are allowed. Such a door can be easily cleaned and covered, for example with material, leather or foam.

Figure 11:
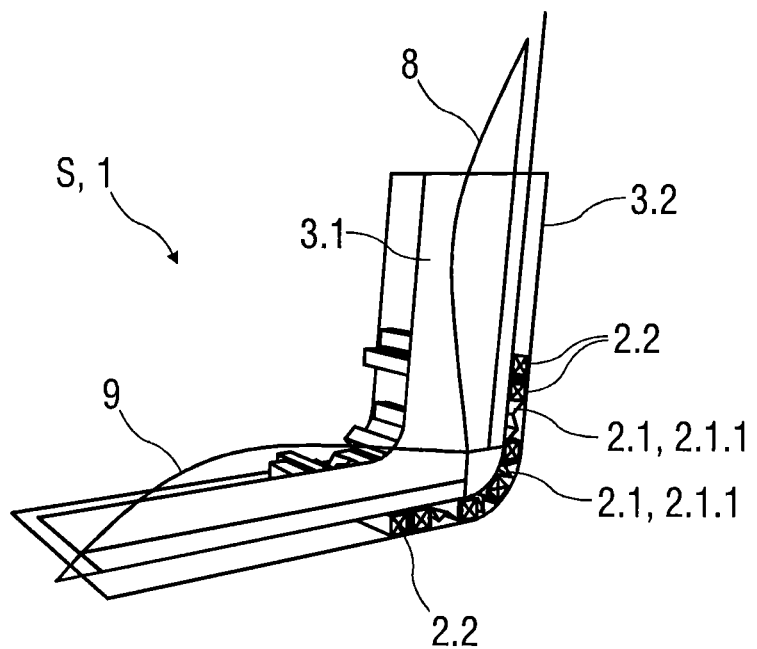
Figure 12:
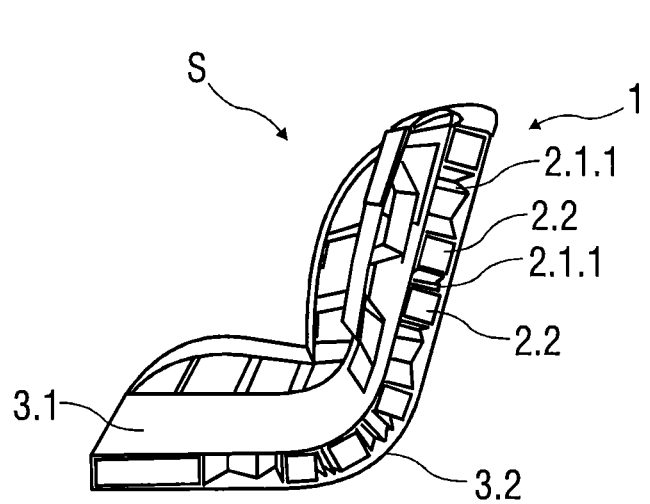

FIGS. 11 to 12 schematically show a use of the above-described flexible structural component 1 for a seat S. In this case, the structural component 1 can form only a subregion of the seat S, for example side flanks 8 or seat supports 9. In this case, the spacer elements 2.2 can be controlled individually or in groups in order to achieve arcuate support. The structural component 1 can be arranged in the foam padding or beneath the padding. In this case, the spacer elements 2.2, also referred to as kinetic cells or "morphing surface", can be controlled via the entire surface such that simply by the deformation, in particular inclination of the structural component 1, for example a backrest, resultant displacement paths can be used in order to achieve surface morphing.

Alternatively, it is also possible for individual segments or spacer elements 2.2 to be electrically controlled independently of one another.

Figure 13:
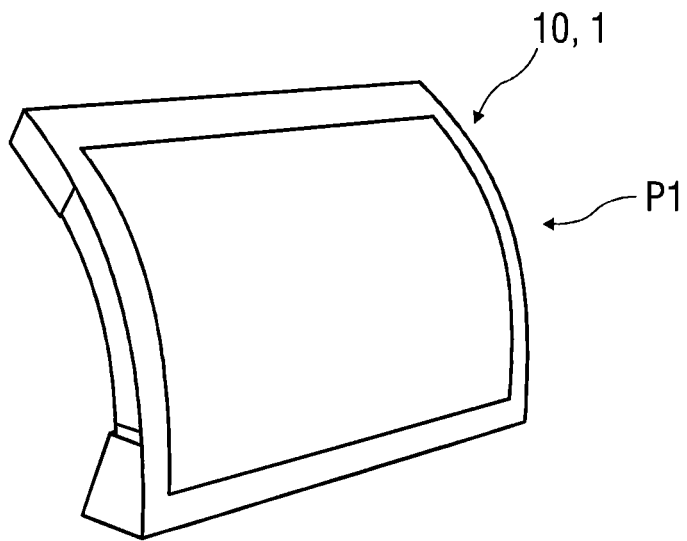
Figure 14:
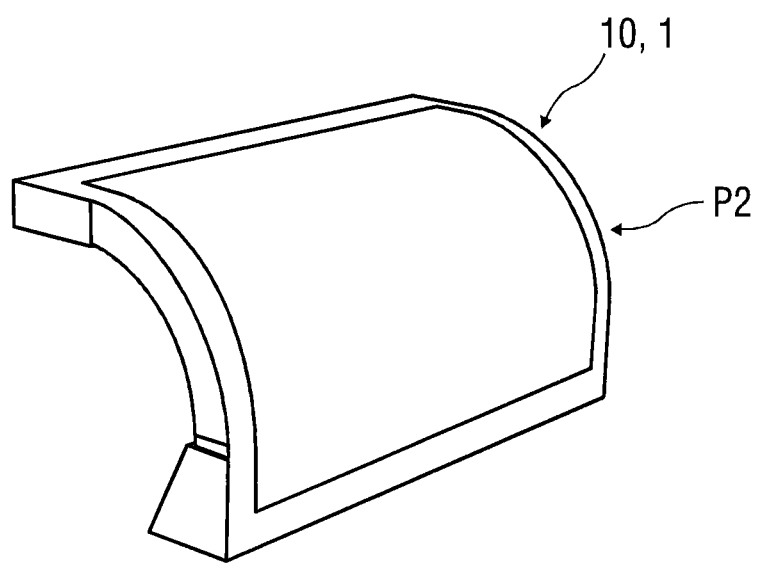

FIGS. 13 to 14 schematically show a use of the above-described flexible structural component 1 for a display unit 10 in various set positions P1 to P2, wherein P1 represents a slightly inclined position, P2 a more greatly inclined position. The flexible structural component 1 can be combined with a display unit 10 for a bendable display or thin-film display, in particular connected thereto and controlled accordingly. As a result, curved displays, for example for an overhead display or a wall display screen, are allowed.

Figure 15:
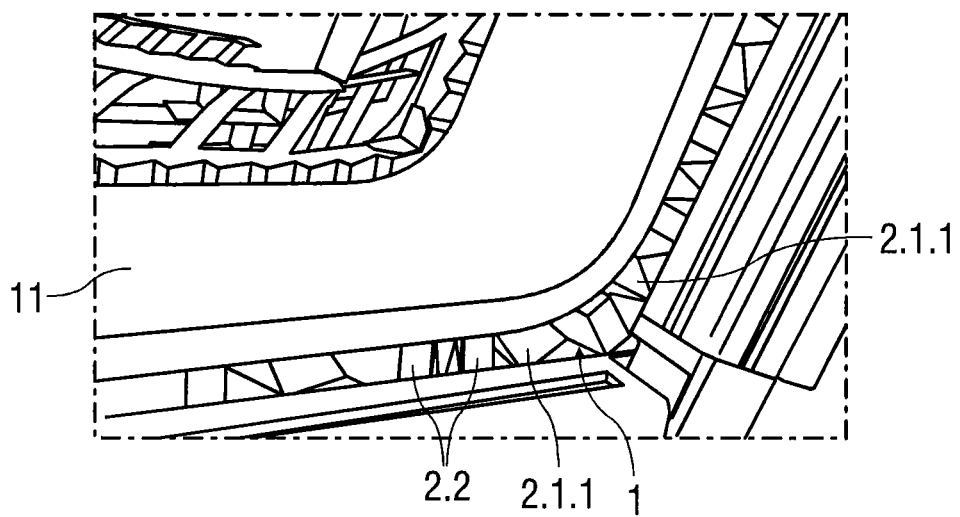

FIG. 15 schematically shows a use of the above-described flexible structural component 1 for a spring suspension mat 11. In this case, the structural component 1 is used as a controllable spring suspension mat 11 in order to produce a mechanical connection between seat cushion and backrest.

Figure 16:
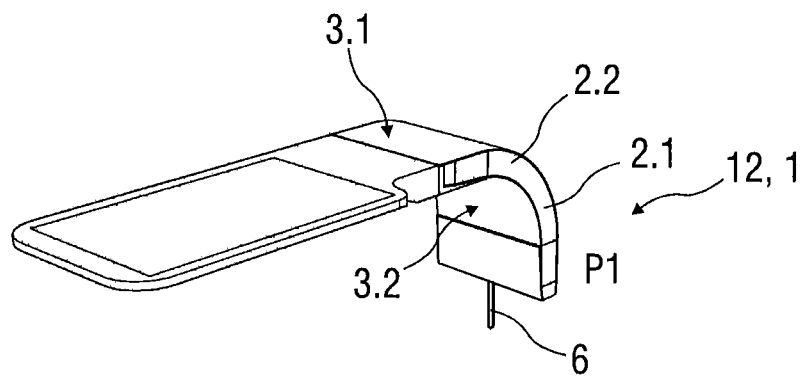
Figure 17:
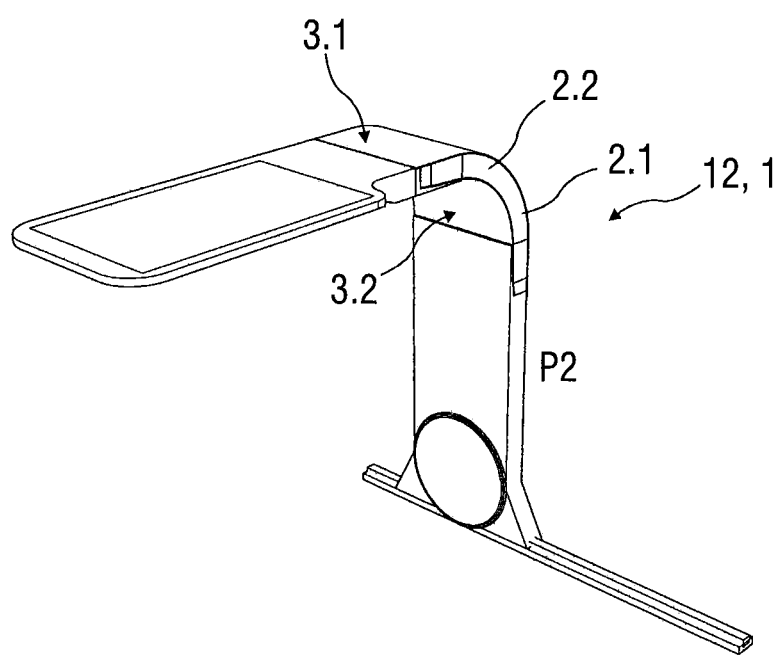
FIG. 17 schematically shows an embodiment of a flexible structural component forming an adjustable table.

FIGS. 16 to 17 show a use of the above-described flexible structural component 1 for an electrically adjustable table 12 in various set positions P1 to P2, wherein P1 represents a slightly inclined position, P2 a more greatly inclined position.

LIST OF REFERENCE SIGNS

1, 1', 1" Structural component
1.1 Flexible structure
2 Adjusting mechanism
2.1 Folding or lever element
2.1*a* Outer folding element
2.1*m* Middle folding element
2.1.1 Flexible lever element
2.2 Spacer element
2.3 Upper surface
2.4 Lower surface
3.1 Upper surface element
3.2 Lower surface element
4 Lamp
5 Motor-transmission unit
6 Shaft
7 Partition wall
7.1 Guide rail
8 Side flank
9 Seat support
10 Display unit
11 Spring suspension mat
12 Table
B Bending axis
BG Inclination movement
FK Folded edge
FKa Horizontal folded edge
FKm Vertical folded edge
PF1, PF2 Arrows
P1 to P3 Position
S Seat

What is claimed is:

1. A structural component comprising:
   a flexible structure having at least one adjusting mechanism which is formed at least from a plurality of folding elements or lever elements and
   spacer elements which are coupled together such that their upper surfaces are connected together by an upper surface element and their lower surfaces are connected together by a lower surface element,
   wherein the spacer elements alternate between being connected only at an upper end to the upper surface element and only at a lower end to the lower surface element,
   wherein the upper surface element and the lower surface element are set up to move in a defined manner in the event of an inclination movement of the flexible structure.

2. The structural component as claimed in claim 1, wherein the adjusting mechanism is formed as a folded construction made up of a plurality of folding elements or lever elements and a plurality of spacer elements that are coupled together in terms of movement.

3. The structural component as claimed in claim 1, wherein the at least one folding element is configured as an extensive or strip-like folding element with at least a 1-fold mechanism or a multi-fold mechanism.

4. The structural component as claimed in claim 1, wherein the folding element is arranged between two spacer elements or against one spacer element.

5. The structural component as claimed in claim 1, wherein the folding elements or lever elements are connected to the spacer elements in different orientations.

6. The structural component as claimed in claim 1, wherein a plurality of folding elements or lever elements, which are arranged in an offset manner with respect to one another, are arranged between two spacer elements.

7. The structural component as claimed in claim 6, wherein at least two folding elements or lever elements are arranged in an offset manner with respect to one another such that their folded edges or joint axes are perpendicular to one another.

8. The structural component as claimed in claim 6, wherein the spacer element(s) is/are configured as hollow and/or profile elements.

9. The structural component as claimed in claim 6, wherein the spacer elements are coupled together in terms of movement by the folding elements or lever elements.

10. The structural component as claimed in claim 6, wherein the mutual spacing of the spacer elements changes in the event of an inclination movement of the flexible structure.

11. The structural component as claimed in claim 6, wherein the upper surface element and the lower surface element are each formed from such a flexible material and/or with such a material thickness that they are each able to be bent or inclined in a defined radius through at least 90 degrees.

12. The use of a structural component as claimed in claim 6 as a movable component, including a movable door, an adjustable partition wall, an adjustable seat with or without an adjustable contour, a seat with an adjustable contour, a movable display unit, a movable display screen, an adjustable table, an adjustable armrest, an adjustable lamp.

13. A seat component, including a backrest or seating part, wherein the seat component comprises at least:
    a supporting structure,
    a covering comprising a padding and/or a cover element, and
    a structural component as claimed in claim 1.

14. The seat component as claimed in claim 13, wherein the structural component, including the upper surface element, is coupled in terms of movement to the covering.

15. The seat component as claimed in claim 13, wherein the structural component is arranged between the supporting structure and the covering.

16. A seat comprising at least two seat components that are movable relative to one another, of which at least one of the seat components comprises a structural component as claimed in claim 1.

\* \* \* \* \*